May 29, 1973  J. S. ROGERS, JR., ET AL  3,736,102
CARBON BLACK REACTOR

Filed Nov. 19, 1970  2 Sheets-Sheet 1

INVENTORS
J. S. ROGERS
G. J. FORSETH

BY

Young & Quigg

ATTORNEYS

United States Patent Office 3,736,102
Patented May 29, 1973

3,736,102
CARBON BLACK REACTOR
Joseph S. Rogers, Jr., and Glenn J. Forseth, Borger, Tex., assignors to Phillips Petroleum Company
Filed Nov. 19, 1970, Ser. No. 90,935
Int. Cl. F27d 1/04
U.S. Cl. 23—259.5                                    1 Claim

ABSTRACT OF THE DISCLOSURE

A carbon black reactor employing a dished head at its feed inlet, this head being adapted with a suspended arch and an interpositioned layer of insulation.

---

Figure 1:
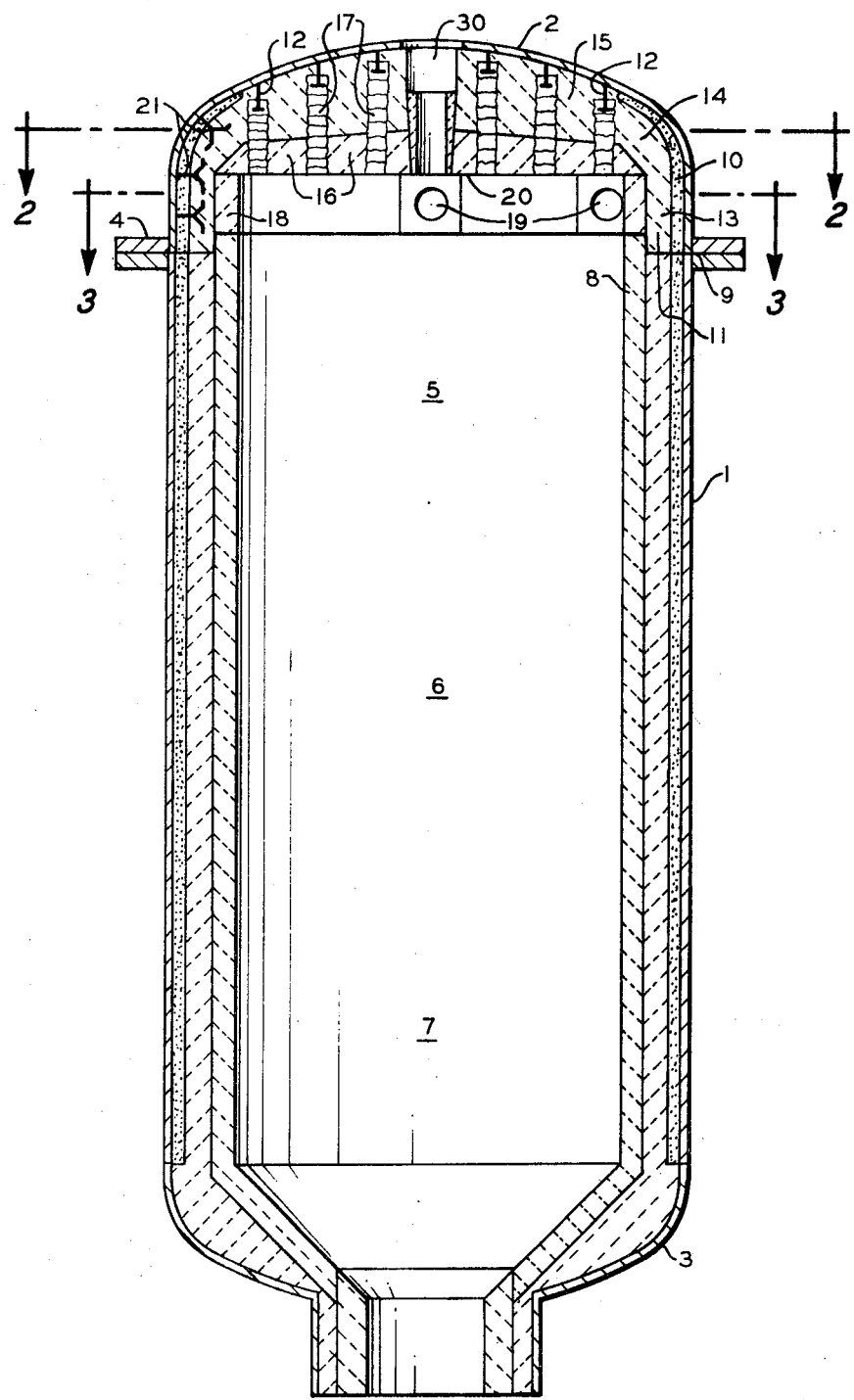

This invention relates to carbon black reactors or furnaces.

In one of its more specific aspects, this invention pertains to vertically-positioned carbon black reactors particularly suitable for the production of large particle carbon black.

One of the principles involved in the production of large particle carbon black is the establishment of low reactant velocities in large diameter reactors. Simultaneous therewith, however, is the problem of expansion due to the high temperatures involved and the desirability of using dished or elliptical heads as a matter of precaution in consideration of the possibility of explosions within the reactor.

The carbon black reactor of the present invention is directed towards the solution of those problems. While dished heads have been previously employed in carbon black reactors, this invention presents a carbon black reactor which possesses, in essence, a "suspended arch" within a dished head enclosure.

According to this invention there is provided a carbon black reactor which comprises an insulated chamber closed by a head having a curved inner surface. This surface is insulated by a plurality of layers of refractory. One of these layers is positioned vertically within the head. One of these layers is suspended from the insulated surface. One layer is positioned between the suspended layer and the head. One layer of insulation is positioned adjacent to the surface of the head at least over a portion of its surface.

Generally speaking, the carbon black reactor of this invention is composed of a series of zones, preferably in axial contiguous alignment, these zones being designated as the feed introduction zone, a reaction zone and a quench zone, these zones being enclosed by refractory walls, the reactor being adapted with reactant inlet conduit means and product recovery means. The refractory walls are preferably constructed of a plurality of courses with at least two inner courses of the reaction zone and quench zone being formed of castable insulation and at least two inner courses of the feed introduction zone being formed of refractory shapes. The reactor is closed at its upper, or reactant inlet end, by a head of outwardly concave configuration which is adapted with a suspended arch and with insulation positioned between the suspended arch and the concave inner surface of the head. By means of this construction, any explosion occurring within the reactor tends to be dispersed with the resulting forces being evenly distributed within the vessel which it encloses. Relatedly, however, the suspended arch construction employed acts as a substantially flat surface which reduces eddy flows in the upper portion of the reactor, and hence minimizes the deterioration of that insulation with which that head is protected. Problems of deterioration have been paramount in prior installations when a dished head was employed, the insulation of that head being installed to approximate the curvature of the inner surface of the head.

Figure 2:
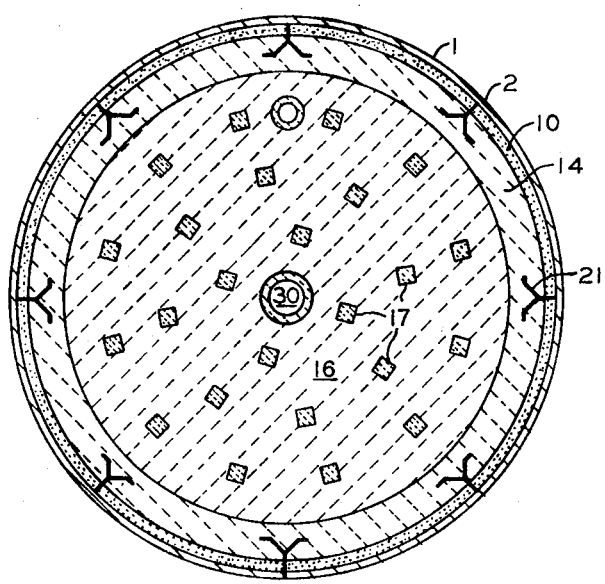
Figure 3:
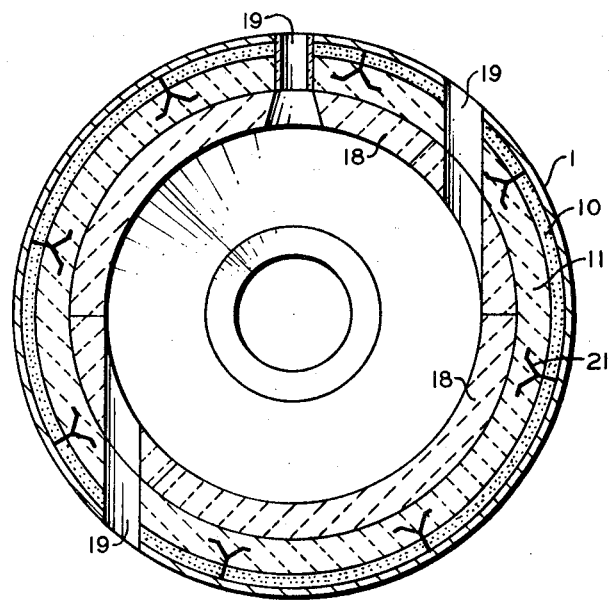

The apparatus of this invention will be more easily understood if explained in conjunction with the attached drawings which illustrate a best mode of practicing the invention and in which FIG. 1 is an elevation view of the reactor of this invention; FIG. 2 is a cross-sectional view through section 2—2 of FIG. 1; and FIG. 3 is a cross-sectional view through section 3—3 of FIG. 1.

Referring now to FIG. 1 there is shown reactor 1 closed at its upper end and, optionally, at its lower end by elliptical heads 2 and 3. That head at the outlet end of the reactor is preferably welded to the vertical walls of the vessel while that at the upper end of the reactor is preferably flanged by means of matching flanges 4.

The reactor will be insulated throughout its inlet section 5, reaction section 6 and quench section 7 preferably by multi-course refractory layers of either shapes or castables, or a combination thereof.

Upper head 2 can be of any suitable curvature. It will be insulated as an integral unit which can be detached from the vessel, preferably without requiring reinsulation of either the head or the vessel, particularly in that area proximate the flanges.

For this purpose, the inner refractory course 8 of the vessel is extended above the mating surfaces 9 of the flanges whereas the outer refractory course 10 of the head and the middle refractory course 11 of the head extend below the knuckle radius of the head to the level of the mating surfaces.

The outer refractory course extends from the flanges to a distance up to and not surrounding anchor clips 12. Preferably, this course is castable and tapers in thickness from about 2″ to about 1″ before being terminated about ½″ before contacting the clips. Since this layer of insulation has a low thermal conductivity, to extend it into contact with the anchors would promote their overheating.

Extending down to the mating flanges is middle course 11. This course will be about equal in thickness to that course of wall refractory with which it comes into matching relationship. It will preferably be cast in place and be of uniform thickness along its vertical portion 13 and along some section 14 of its curved portion enlarging to a portion 15 of varying depth which forms a substantially horizontal inner surface and provides for the substantially horizontal positioning of suspended arch 16 positioned therebeneath. By positioning layer 15 against the head, there is also provided a suitable thickness for stabilizing anchors 17 affixed to the anchor clips.

Inwardly positioned of the middle course is inner course 18 which is preferably comprised of arch brick matching that which comprises inner refractory course 8 of the vessel. Through course 18 extend those openings, such as 19, provided through the circular periphery of the head in its vertical wall.

Positioned above inner course 18 and below middle course 11 is suspended arch 16. It is supported by anchors 17 and forms a substantially horizontal lower surface 20. The upper surface of arch 16 tapers slightly towards its outer edge and then tapers sharply to its outer edge. This layer is made thicker in its central position to impart strength, that is, to aid in supporting that greater thickness of middle course 11 positioned thereover. Relatedly, suspended arch 16 is chamfered at its outer edge to allow for that desired thickness of middle course 11 in its transition from its vertical section 13 to its upper section 15. Further, the extent to which the suspended arch is brought to the wall of the head is not such as to interfere with the metal anchors 21.

Hence, within the dished head there are positioned at least four layers of insulation having different thermal conductivities, one of the layers positioned as a suspended arch and one of the layers extending over the entire internal configuration of the head and positioned between the suspended arch and the internal surface of the head and one of the layers being vertically positioned to be supported by a layer of insulation projecting upwardly from the body of the vessel into the head and one of the layers positioned in contact with the internal surface of the head over at least a portion thereof.

Many refractories suitable for the operating conditions encountered in the production of carbon black are commercially available. These are selected with concern for the operating temperature involved for the specific layer concerned. In the present instance, outer refractory 10 would have an operating temperature to about 1800° F., middle course 11 would have an operating temperature to about 2500° F., the suspended arch 16 would have an operating temperature to about 3300° F., and the inner course 18 would have an operating temperature to about 3250° F.

Various openings into the vessel head can be made as shown in FIGS. 2 and 3, including opening 30 centrally positioned and opening downwardly into the head, and openings 19 opening through the vertical sides of the head either radially or tangentially into the head, these openings being formed in the insulation or being comprised preferably of ceramic tubes projecting through the wall.

It will be evident from the foregoing that various modifications can be made to the apparatus of this invention. Such, however, are considered within the scope of the invention.

What is claimed is:

1. A carbon black reactor which comprises:
 (a) an insulated chamber having vertically upstanding walls;
 (b) a removable head, positionable in closing arrangement to said chamber, said head having a curved inner surface, said surface being insulated by a plurality of layers of refractory comprising a first layer comprised of arch brick vertically positioned within said head, said first layer having an operating temperature up to about 3250° F., a second layer of cast construction suspended from said curved inner surface, said second layer having a section of greatest thickness proximate its central portion and decreasing in thickness outwardly from said central portion and having a substantially horizontal lower surface, said second layer having an operating temperature to about 3300° F., a third layer of cast construction positioned adjacent said curved inner surface and between said first layer and said curved inner surface and between said second layer and said curved inner surface, said third layer having a section of greatest thickness proximate its central portion and decreasing in thickness outwardly from said central portion and having an operating temperature to about 2500° F., a fourth layer having an operating temperature to about 1800° F., said head being adapted with a plurality of openings therethrough for introduction of reactants into said chamber, at least one of said openings opening into said chamber axially through said head through said second and third layers and a plurality of openings opening into said chamber through the circumferential periphery of said head through said first, third and fourth layers, said second and third layers being suspendedly supported from the curved inner surface of said head, and said first and third layers being supported by said vertically upstanding walls of said chamber, said plurality of layers forming a substantially horizontal lower surface.

References Cited
UNITED STATES PATENTS

| | | | |
|---|---|---|---|
| 2,877,717 | 3/1959 | Read | 23—259.5 |
| 3,560,164 | 2/1971 | Venable, Jr. | 23—259.5 |
| 1,158,776 | 11/1915 | Bernhard | 110—99 R |

JAMES H. TAYMAN, Jr., Primary Examiner

U.S. Cl. X.R.

264—30; 196—133; 263—46 R; 52—249